United States Patent [19]

Ekstrom et al.

[11] Patent Number: 4,581,566
[45] Date of Patent: Apr. 8, 1986

[54] SYSTEM FOR AUTOMATICALLY CALIBRATING A ROBOT

[75] Inventors: Gosta E. Ekstrom, Lidingö; Laszlo Szonyi, Enskeole, both of Sweden

[73] Assignee: International Business Machines Corporation, Armonk, N.Y.

[21] Appl. No.: 628,871

[22] Filed: Jul. 9, 1984

[30] Foreign Application Priority Data

Jul. 22, 1983 [SE] Sweden ................................. 8304101

[51] Int. Cl.⁴ ............................................. G05B 19/42
[52] U.S. Cl. .................................... 318/568; 364/513; 901/3; 318/632
[58] Field of Search ..................... 318/568, 632; 901/2, 901/3; 364/513

[56] References Cited

U.S. PATENT DOCUMENTS 4,287,459  9/1981  Dahlstrom .......................... 318/568
4,362,977 12/1982  Evans et al. ........................ 318/568
4,495,588  1/1985  Nid et al. ............................ 364/513

Primary Examiner—B. Dobeck
Attorney, Agent, or Firm—Harold H. Sweeney, Jr.

[57] ABSTRACT

A system for automatically calibrating a robot in all degrees of freedom in one point to compensate for inaccuracies in the different coordinate directions. The system includes moving a measuring body, held by the robot gripper, in response to a command representative of a previously determined nominal position within a measuring fixture known to the robot controller, determining by means of sensing means the actual position reached by said measuring body, calculating the errors in the different coordinate directions based on the measured values and the nominal position values and compensating for the errors in respective coordinate directions.

9 Claims, 11 Drawing Figures

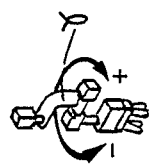
FIG. 1B
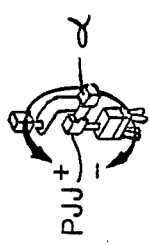
FIG. 1C
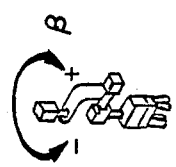
FIG. 1D
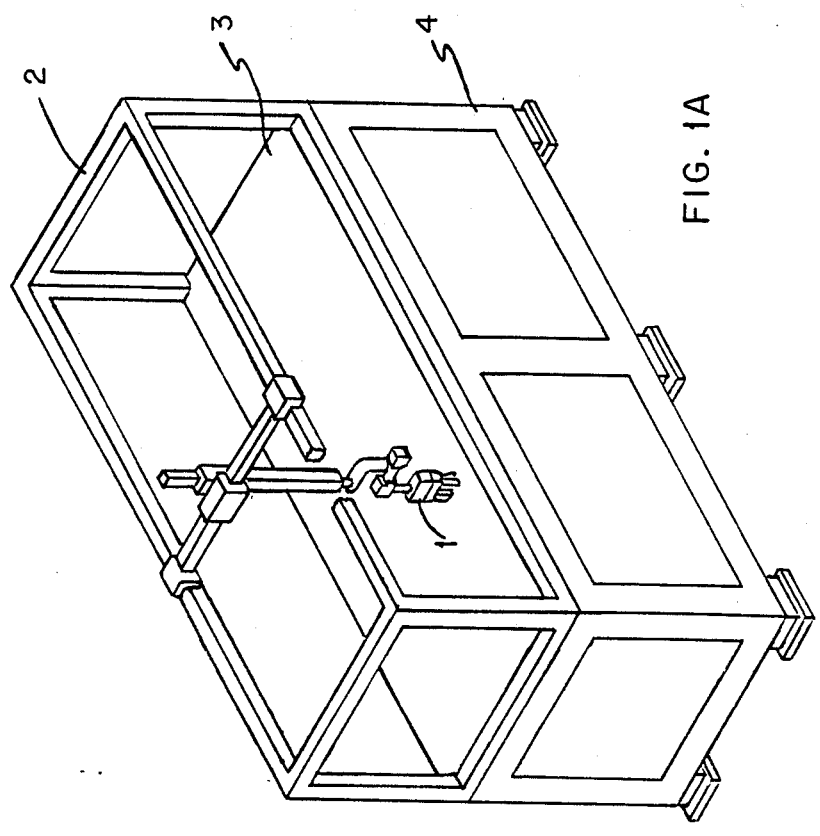
FIG. 1A
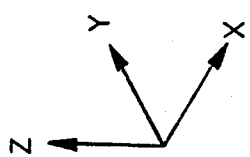

SYSTEM FOR AUTOMATICALLY CALIBRATING A ROBOT

BACKGROUND OF THE INVENTION

The invention relates to a system for automatically calibrating and compensating a robot in all degrees of freedom.

In robot applications the robot gripper is under computer control, programmed to successively and repeatedly be positioned and operated in predetermined positions within the work envelope of the robot. Reference is made to IBM Robot System/1, General Information Manual and User's Guide which describes such a robot system in detail.

At the start up of a new work process it is necessary to let the gripper start from an exactly defied home position. Then during operation of the robot, errors in the positioning of the gripper may occur due to errors in some or all of the six coordinate directions. Therefore, calibration and compensation of the robot in all coordinate directions is necessary at suitable time intervals.

Such calibrations have previously been performed by means of separate measurements for each coordinate direction and at different points depending on the coordinate direction to be measured. Then, from the values received, corrections are made in the separate coordinate directions. Such measurements are very time consuming. Besides, as the direction coordinates depend on each other repeated measurements must be performed to get satisfactory precision.

U.S. Pat. No. 4,362,977, issued Dec. 7, 1982, describes such a method and apparatus for calibration of a robot and uses the results of the calibration to compensate for inaccuracies of the robot. The method includes moving the robot gripper to a set of nominal positions, commanded by the robot controller or measured by position encoders built into the robot, and determining the associated actual positions by measuring the robot position with an independent accurate measuring means or by aligning the robot end effector with an accurate calibration mask. The calibration results are stored and subsequently used to compensate for robot inaccuracy so that the robot moves to the actual desired positions.

SUMMARY OF THE INVENTION

The invention as claimed is intended to remedy the above mentioned drawbacks. It solves the problem by means of a onestep determination of the space coordinates of the robot in all degrees of freedom in one point within the work envelope of the robot. This is performed by letting the robot position a measuring body in a calibrating position within a measuring fixture which is fixedly mounted to the robot frame. The measuring body may, for example, consist of three cube surfaces which are exactly defined in relation to the gripper definition point. The measuring fixture may, for example, consist of an array of sensing means which are positioned in three surfaces of the measuring fixture corresponding to the above mentioned three surfaces of the measuring body. From the measuring values received from the sensing means the errors in the different coordinate directions are calculated and the robot is ordered to compensate for the errors. Alternatively, the error values may be added to the computer command values as correction values.

BRIEF DESCRIPTION OF THE DRAWINGS

On way of carrying out the invention, which is defined in the attached claims, is described in detail below with reference to the attached drawings which illustrate only one specific embodiment, in which FIG. 1A is an isometric view of a robot sytem with a robot gripper movable in six degrees of freedom, FIG. 1B–D shows the three degrees of freedom of the robot hand.

DESCRIPTION OF THE PREFERRED EMBODIMENT

Figure 2:
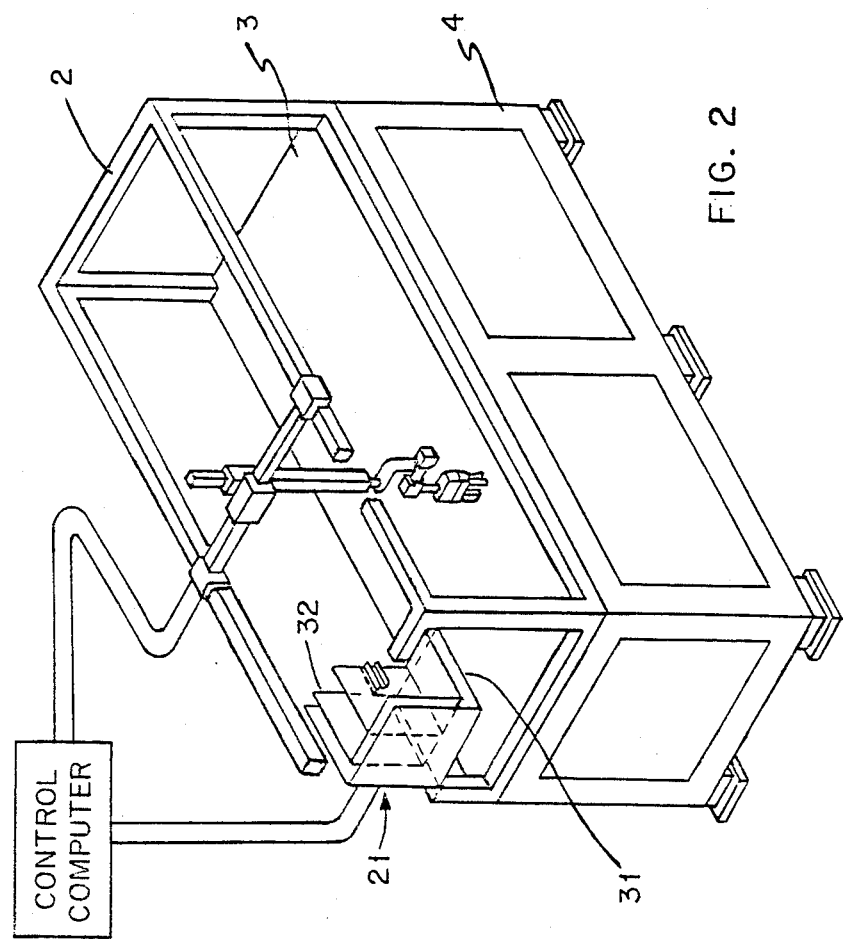
FIG. 2 is an isometric view of a robot system provided with a calibration device in accordance with the invention.

Referring to FIGS. 1 and 2, there is shown a schematic diagram of a robot or object manipulator of the box frame type which is marketed by International Business Machines Corp. under the name of 7565 Manufacturing System. Except for the calibration system as hereinafter described, the remainder of the robot, including its control system, is otherwise known to those skilled in the art. The calibration system of this invention is not limited to this manipulator, but is adaptable to most robots.

In FIG. 1, a robot gripper 1 operates under computer control within the work envelope 2 (shown in phantom) of the robot. The gripper is movable in six coordinate directions, a, $\beta$, $\gamma$, x, y and z, where a is the yaw coordinate, $\beta$ is the pitch coordinate and $\gamma$ is the roll coordinate. Tools and materials are positioned on a work table 3 fixedly mounted to the robot frame 4. These tools and materials are positioned on the work table in exactly defined positions to allow the robot gripper to find and handle them. The work space of the robot is defined by a robot coordinate system (x,y,z).

At the start up of a new work process the gripper must first be calibrated and compensated, that means, to be positioned in a start position which is exactly defined in the robot coordinate system. From that position the robot gripper can start to operate under computer program control. Besides, during the work prcess of the robot, errors in the positioning of the gripper occur due to drift in some or all of the six coordinate directions. Then, malfunction of the robot operation may occur if the gripper does not find the tool or material needed. Therefore, calibration and compensation of the robot coordinates at suitable time intervals is a requisite.

FIG. 2 shows an isometric view of a robot provided with a calibration device 21 shown in schematic form. The calibration device consists of two main parts (see also FIG. 3), a first part 31 fixed to the robot frame and a second part, a cube formed measuring body 32 which is gripped by the gripper. This second part may be positioned in a suitable position within the work envelope of the robot. In calibration mode the gripper grips the second part and moves it into the calibrating position within said first part of the calibration device. Preferably, the second part is spring mounted in a position within said first part 31. The second part is described more in detail below.

Figure 3:
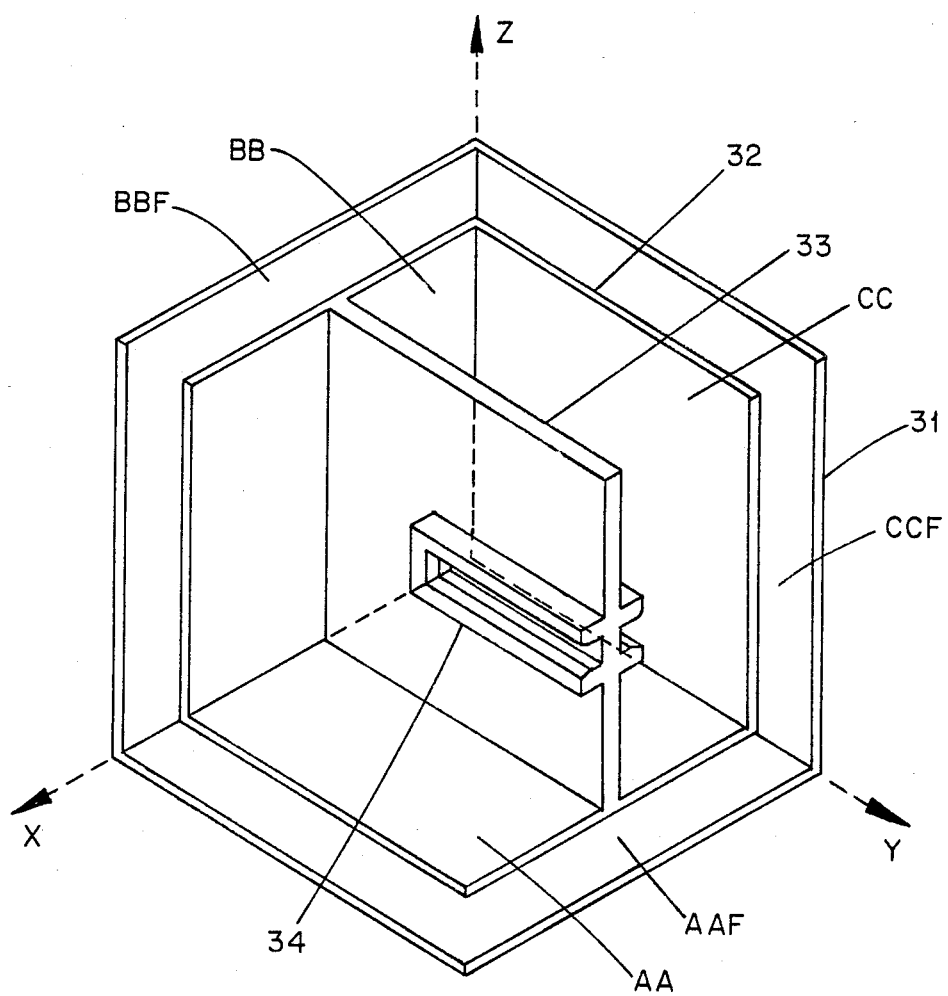
FIG. 3 is an isometric view of the calibration device.
Figure 4:
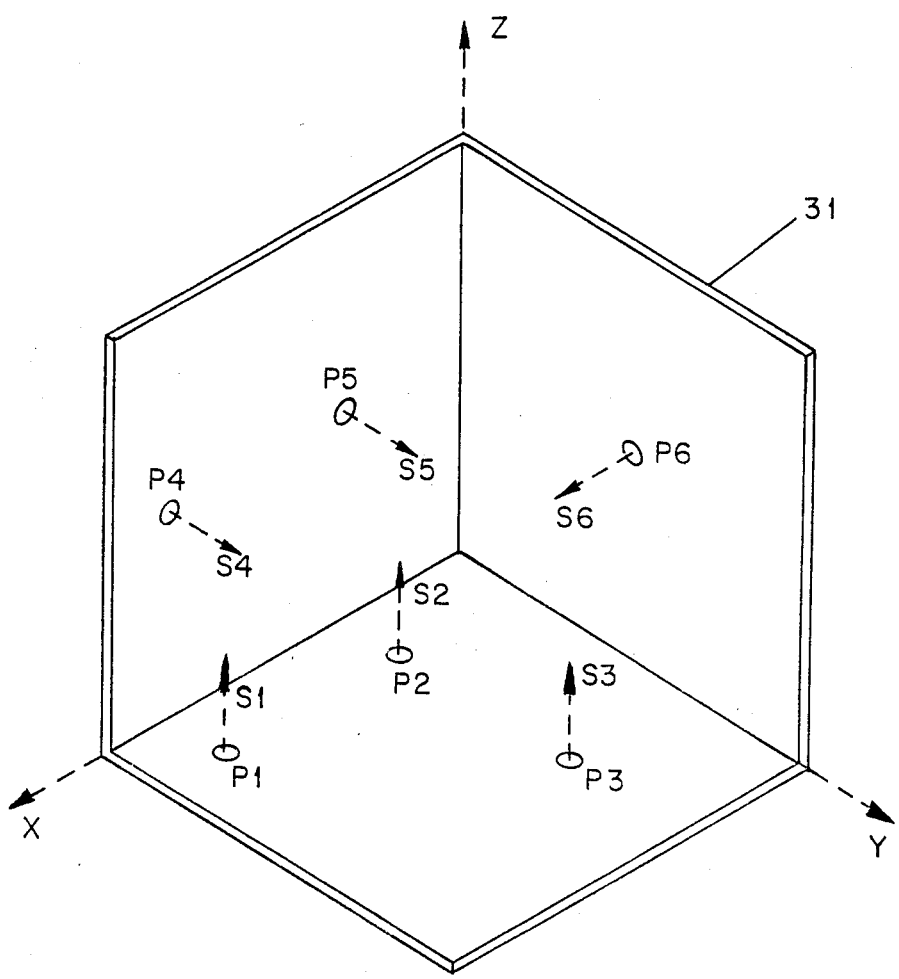
FIG. 4 is an isometric view showing the fixed part of the calibration device.

As shown in FIGS. 3 and 4 the fixed part of the calibration device consists of three walls AAF, BBF and CCF of a cube 31. The fixed part is provided with sensing means S1–S6 (indicated in phantom) for determining the position in space of said second part 32, the measuring body, during calibration.

The positions, P1–P6, of the sensors S may be as indicated in FIG. 4 or in other suitable positions. Six such sensors are used to define the position in space of the measuring body. Preferably the distribution is three in surface (wall) AAF, two in surface (wall) BBF and one in surface (wall) CCF. The sensors are placed perpendicular to respective surfaces in positions defined for S1–S3 in the x-y plane, for S4 and S5 in the x-z plane and for S6 in the y-z plane of the robot coordinate system as indicated in phantom in FIG. 4. Said first calibration part 31 is fixedly mounted to the robot frame in such a way that its coordinate axes x, y, z are exactly parallel to or coinciding with (FIG. 5) respective coordinate axes x, y and z in FIG. 1.

The Heidenhain-Metro gauge head MT30 with Heidenhain-Metro counter VRZ181, marketed by the Heidenhain Corp., Elk Grove Village, Ill., can be used as the sensors S1–S6. These devices utilize a plunger which extends virtually away from the fixed part 31 of the measuring device. The plunger is driven by a linear electric or hydraulic motor. Attached to the plunger within the sensor body is a fine grating. A light source and a photocell are arranged on opposite sides of the grating in order to respond to change in position of the grating. The pulses from the photocell are fed to a counter. Thus, the accumulated value in the counter is a measure of the moved distance.

The plunger of the sensor has an idle position (a zero position). When calibration is to take place, the plunger is driven by the linear motor from its zero position towards the measuring cube 32 and is stopped when it contacts the cube surface. The accumulated value is then converted to a usable form. For example, the moved distance may be expressed in BCD code. Of course, there are many other types of sensors which may be equally suitable.

Figures 5, 5A:
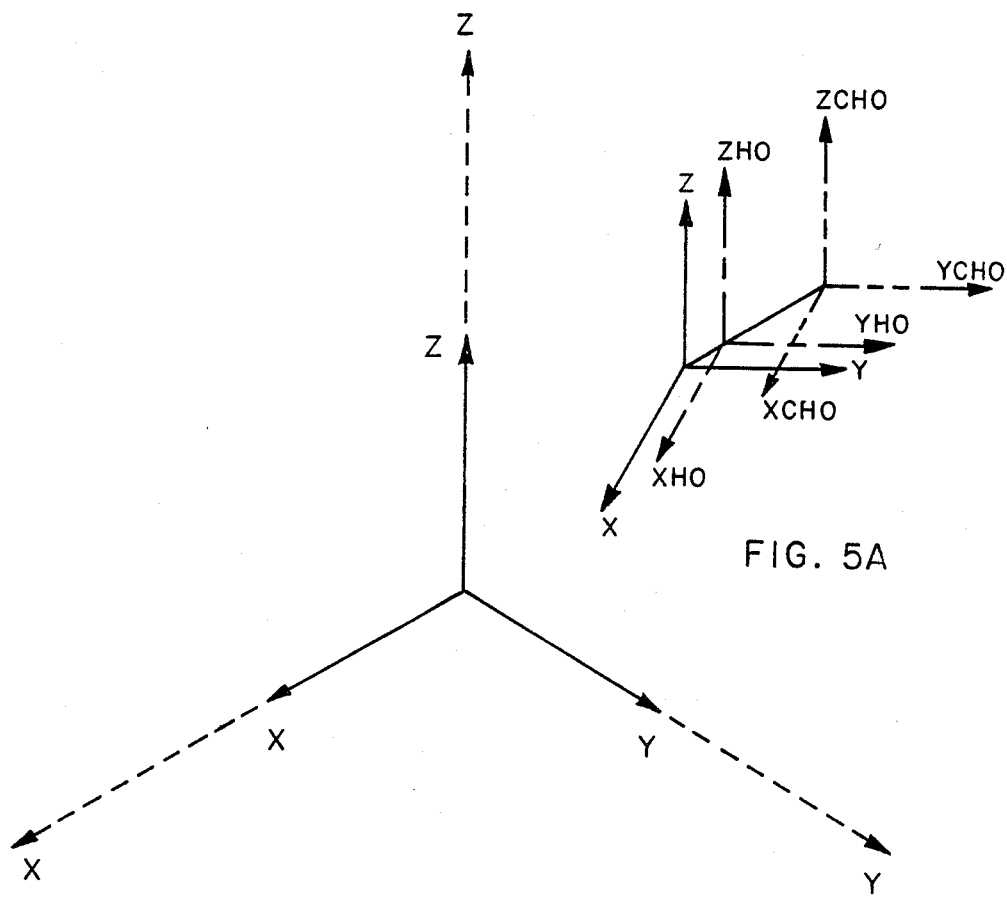
FIG. 5 is a schematic view showing the coordinate systems used to describe positions in space.

FIG. 5a shows the relations between the different coordinate systems used. A home coordinate system (XHO, YHO, ZHO) for the measuring body, the measuring cube, is indicated in dashed lines in FIG. 5a. When the measuring body is brought into home position all the sensors indicate predetermined values. Accordingly, the robot gripper is in an exactly defined start position. FIG. 5a also shows the cube central home coordinate system (xCHO, yCHO, zCHO), that is, a coordinate system coinciding with the cube central coordinate system, when the cube is in its home position. The central cube coordinate system (xC, yC, zC) has its origin in the central point of the measuring cube and has its axes perpendicular to the cube surfaces.

Figure 6:
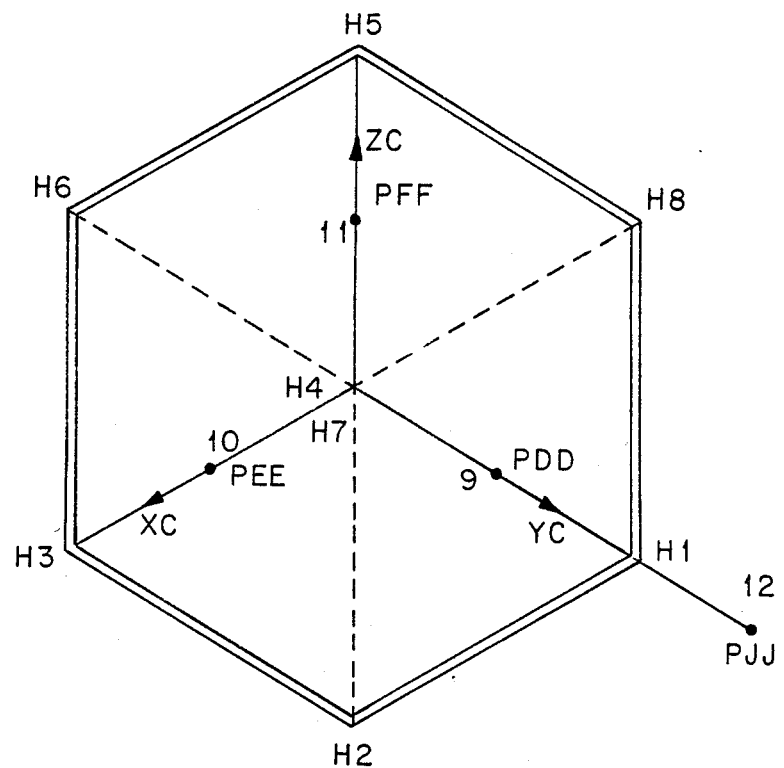
FIG. 6 is an isometric view of the measuring cube with an inserted cube coordinate system.

FIG. 6 shows the intersectional points PEE, PDD and PFF between the positive cube central coordinate x-axis, y-axis and z-axis and the imaginary cube surfaces EE, DD and FF, respectively. The joint point PJJ is situated on the yc-axis of the cube.

Figure 7:
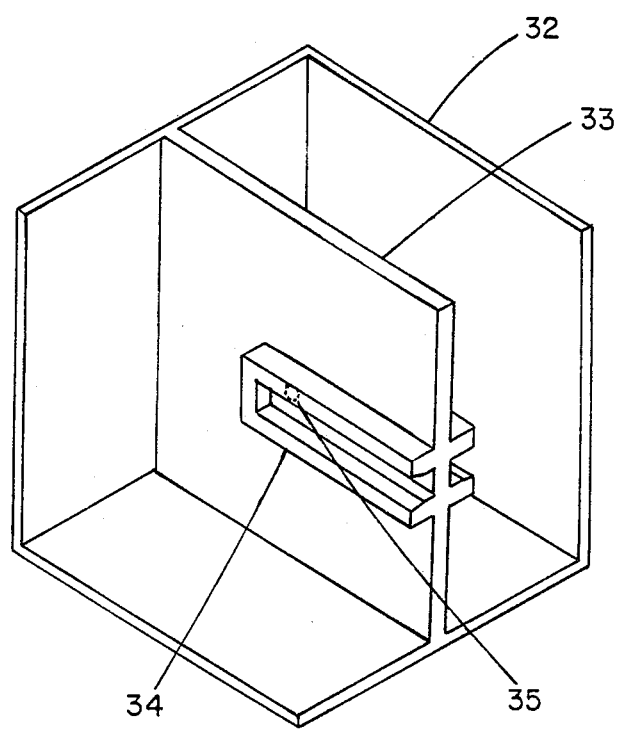
FIG. 7 is an isometric view of the measuring body.
Figure 8:
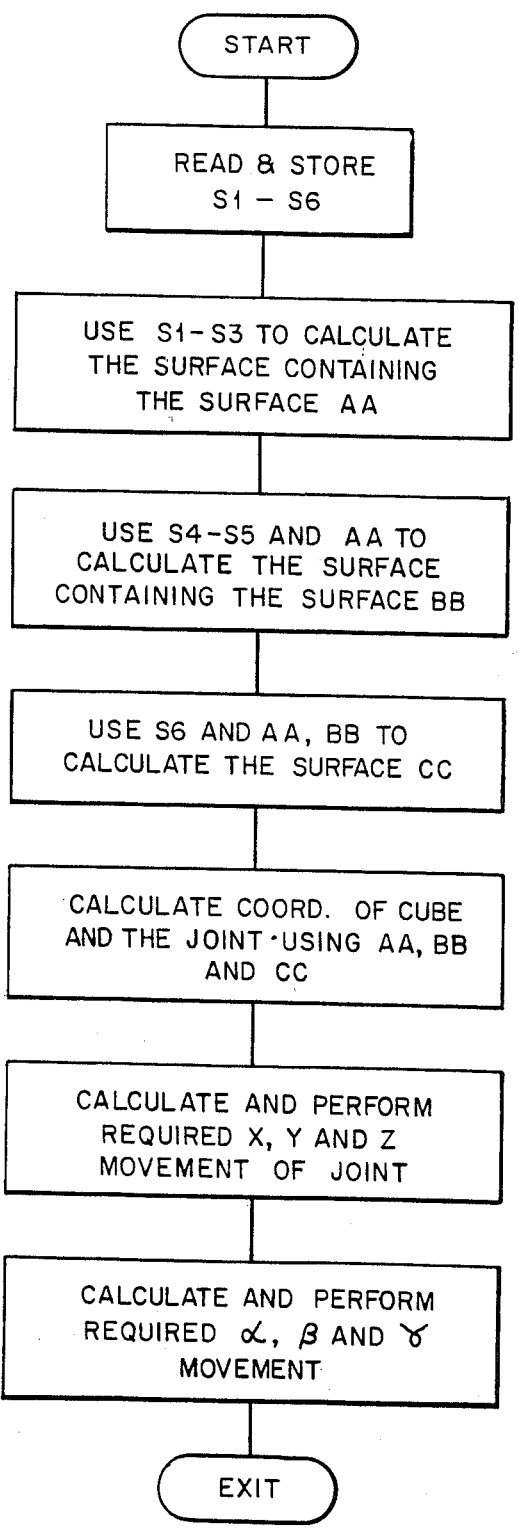
FIG. 8 is a flow diagram illustrating the operation of the invention.

FIG. 7 is a separate view of the measuring cube. The cube is provided with an intermediate wall 33 having a guiding profile 34 for guiding the cube definition point 35 to coincide with a corresponding definition point on the gripper when the gripper grips the cube. The gripper 1 is positioned via the robot control and program such that the fingers of the gripper close into the grooves of the guiding profile 34 so that the cube definition point 35 lines up with the corresponding reference point on the gripper.

The calculations of the errors in the six coordinate directions are described below with reference to the drawings. For the sake of simplicity the calculations are made using vectors. The elements in a vector are arranged linearly or in one dimension. That is, for a vector in a three dimensional space there is a first component (the x coordinate), a second component (the y coordinate and a third component (the z coordinate). The reference point of the vector originates in the coordinate system.

Another form of an array is the matrix, in which the components are arranged in rows and columns. An n corner body in a three dimensional space is completely defined by a matrix containing three rows and n columns, that is one row for each coordinate axis and one column for each corner.

The components of an array are expressed by indices. An index value is needed for each dimension of an array in order to select a component. Thus, in an N by M matrix P [1;1] is the component in the first row and the first column and P [N;M] is the component in the Nth row and the Mth column and so on.

The automatic calibration process is performed in three steps.

(1) The robot gripper grips under computer program control the measuring body 32 and moves it into a premeasuring position within the measuring fixture 31. Alternatively, the robot grips the measuring body in its premeasuring position.

(2) The position of the cube in space is sensed by the six sensors S1–S6. The six sensor values give in combination with the known coordinate values for the positions P1–P6 of the sensors the space coordinates of the sensed points. From these coordinate values the position of cube 32 in space and the needed correction values in the six separate coordinate directions are calculated and stored in the computer.

(3) The robot gripper, under computer program control, is moved to a compensated position in accordance with the calculated correction values. Then the robot is ready to start work under computer program control in accordance with a stored work process program. Alternatively, the correction values may be added to the computer command values.

The calculations of the correction values are performed in the following way. From the S1, S2 and S3 values, the surface containing the bottom surface AA of the cube 32 is calculated. The equation of this surface is $$AAAx + BAAy + CAAZ = 1$$

where PAAA(AAA,BAA,CAA) is received from the expression $$\begin{vmatrix} AAA \\ BAA \\ CAA \end{vmatrix} = \begin{vmatrix} 1 \\ 1 \\ 1 \end{vmatrix} \times \begin{vmatrix} x1 & x2 & x3 \\ y1 & y2 & y3 \\ z1 & z2 & z3 \end{vmatrix}$$

where (x1,y1,z1) is the space coordinates of S1 and so on.

The intersectional point between the normal to said surface through P4(x4,y4,z4) and said surface is given by $$NAA4(xNAA4, yNAA4, zNAA4)$$

where $$xNAA4 = ((BAA^2 + CAA^2)0.x4 + (AAA.BAA.y4) - (AAA.CAA.z4) + AAA)0.NNN$$

where $$NNN = (AAA^2 + BAA^2 + CAA^2)$$

$$yNAA4 = (xNAA4 - x4).BAA \div AAA + y4$$

$$zNAA4 = (xNAA4 - x4).CAA \div AAA + z4.$$

Now the surface containing the cube surface BB can be calculated in the same way as the surface containing the surface AA as three points S4—(x4,y4,z4), S5(x5,y5,z5) and NAA4 of the surface are known.

By first calculating the intersectional points NAA6 and NBB6 between the normals to the surfaces containing the surfaces AA and BB, respectively, through S6(x6,y6,z6) and said surfaces, the surface containing the cube surface CC is calculated.

The equations of the three surfaces are given by $$AAAx + BAAy + CAAz = 1$$

$$ABBx + BBBy + CBBz = 1$$

$$ACCx + BCCy + CCCz = 1$$

The intersectional point PH between the cube surfaces AA, BB and CC is found by solving the equation system above. Thus, PH(xH,yH,zH) is $$\begin{vmatrix} xH \\ yH \\ zH \end{vmatrix} = \begin{vmatrix} 1 \\ 1 \\ 1 \end{vmatrix} \times \begin{vmatrix} AAA & ABB & ACC \\ BAA & BBB & BCC \\ CAA & CBB & CCC \end{vmatrix}$$

The unit axes in PH (PXX,PYY,PZZ) along the cube edges are given by $$PXX = (NAA4 - PH) \div ((NAA4 - PH)^2)^{0.5}$$

$$PYY = (NAA6 - PH) \div ((NAA6 - PH)^2)^{0.5}$$

$$PZZ = (NBB6 - PH) \div ((NBB6 - PH)^2)^{0.5}$$

Assume that the length of the cube side is 2d. Then, the position of origin PCO of the cube central coordinate system in the robot coordinate system is defined by $$PCO = PH + dx(PXX + PYY + PZZ)$$

The origin of the cube home coordinate system is defined by PHO(xHO,yHO,zHO) and origin of the cube central home coordinate system is defined by PCHO(xCHO,yCHO,zCHO) (see FIG. 5a).

The position of the origin of the cube central coordinate system defined in the cube central home coordinate system is given by $$PACO = PCO - PCHO$$

Assume that the distance between PCO and the joint is 5d. Then, the points PDD, PEE, PFF and PJJ are defined in the robot coordinate system by $$PDD = PCO + dxPYY$$

$$PEE = PCO + dxPXX$$

$$PFF = PCO + dxPZZ$$

$$PJJ = PCO + 5dxPYY$$

With PCO added these points can be expressed in and operated on in matrix form as follows $$PCUJO = PCO, PDD, PEE, PFF, PJJ$$

or in written out matrix form $$\begin{vmatrix} xPCO & xPDD & xPEE & xPFF & xPJJ \\ yPCO & yPDD & yPEE & yPFF & yPJJ \\ zPCO & xPDD & zPEE & zPFF & zPJJ \end{vmatrix}$$

Transformation from the robot coordinate system to cube central home coordinate system is performed by $$PCUJOC = PCUJO - PCHO$$

The translation matrix MTR for translating PACO into the origin of PCHO is $$\begin{vmatrix} 1 & 0 & 0 & -xPACO \\ 0 & 1 & 0 & -yPACO \\ 0 & 0 & 1 & -zPACO \\ 0 & 0 & 0 & 1 \end{vmatrix}$$

The translated matrix is given by $$TRORIGO = MTRxPCUJOC$$

Now, the errors in the a and $\beta$ coordinates are given by $$a = arctn\ (TRORIGO[3;5]) \div (TRORIGO[2;5])$$

$$\beta = arctn\ (TRORIGO[1;5]) \div (TRORIGO[2.5])$$

A rotation of TRORIGO a degrees around the x-axis and $\beta$ degrees around the z-axis brings the y-axis of the cube central coordinate system colinear with the y-axis of the cube central home coordinate system.

The matrix for rotation around the x-axis, the y-axis and the z-axis, respectively, is $$ROTXAX = \begin{vmatrix} 1 & 0 & 0 \\ 0 & \cos a & -\sin a \\ 0 & \sin a & \cos a \end{vmatrix}$$

$$ROTYAX = \begin{vmatrix} \cos\gamma & 0 & \sin\gamma \\ 0 & 1 & 0 \\ -\sin\gamma & 0 & \cos\gamma \end{vmatrix}$$

$$ROTZAX = \begin{vmatrix} \cos\beta & -\sin\beta & 0 \\ \sin\beta & \cos\beta & 0 \\ 0 & 0 & 1 \end{vmatrix}$$

$$M1 = ROTXAXxROTZAX$$

Thus $$MATO = M1 \times TRORIGO$$

transforms TRORIGO to MATO, which is a matrix having its y-axis colinear with the yCHO-axis.

The error in the γ coordinate direction is given by $$\gamma = arctn\ (MATO[1;4]) \div (MATO[3;4])$$

Rotation of MATO γ degrees around the y-axis brings MATO, that means, the cube and the joint into its home position.

$$MATHO = ROTYAX \times MATO$$

Thus, the needed corrections of the joint point PJJ in x-, y- and z-direction is given by $$XYZ = PCUJO[1\ 2\ 3;5] - MATHO[1\ 2\ 3;5]$$

$$x = XYZ[1]$$
$$y = XyZ[2]$$
$$z = XYZ[3]$$

The correction values $-\alpha$, $-\beta$, $-\gamma$, $-x$, $-y$ and $-z$ for the six coordinate directions are fed to the computer as correction values.

Table 1 below shows the calculations in APL program codes. The following predetermined values are used. P1(10,4,0), P2(4,4,0), P3(4,10,0), p4(10,0,6), P5(4,0,6), P6(0,6,6) and d=5. The predetermined sensor values of 2 are chosen for all sensors, that means, when the measuring cube is brought into home position all sensed values are 2. As will be readily understood table 1 also describes the simulation of the calibration process.

TABLE I

```
         CALIBRATE
ENTER SENSOR VALUES.
 1 ?    2.172839
 2 ?    2.036475
 3 ?    1.978671
 4 ?    1.897867
 5 ?    2
 6 ?    1.987654
CALIBRATION SENSOR VALUES:
S1:  10.000000   4.000000   2.172839
S2:   4.000000   4.000000   2.036475
S3:   4.000000  10.000000   1.978671
S4:  10.000000   1.897867   6.000000
S5:   4.000000   2.000000   6.000000
S6:   1.987654   6.000000   6.000000
THIS IS THE MATRIX IN ROBOT COORDINATES.
    PC0         PDD          PEE          PFF           PJJ
 6.98115344  7.06624830  11.97913837   6.86755137    7.40662778
 6.96015370 11.95921581   6.87613504   7.00830903   31.95546423
 7.07723368  7.03100669   7.19163398  12.07571101    6.84609875
THIS IS THE MATRIX IN CUBE CENTRAL HOME
COORDINATES.
 -.01884656   .06624830  4.97913837  -.13244863   .40662778
 -.03984630  4.95921581  -.12386496   .00830903  24.95546423
  .07723368   .03100669   .19163398  5.07571101  -.15390125
THIS IS THE REQUIRED MOVEMENT OF THE JOINT.
 -.40662778   .04453577   .15390125
THIS IS THE TRANSLATED MATRIX.
  .00000000   .08509487  4.99798494  -.11360206   .42547434
  .00000000  4.99906210  -.08401866   .04815533  24.99531052
  .00000000  -.04622698   .11440031  4.99847733  -.23113492
ALPHA IS:
 -.00924687
AFTER X-ROTATE.
  .00000000   .08509487  4.99798494  -.11360206   .42547434
  .00000000  4.99927583  -.08507290   .00193367  24.99637917
  .00000000   .00000000   .11361852  4.99870892   .00000000
```

TABLE I-continued

```
BETA IS:
 .01702052
AFTER Z-ROTATE
  .00000000   .00000000  4.99870892  -.11361852   .00000000
  .00000000  5.00000000   .00000000   .00000000  25.00000000
  .00000000   .00000000   .11361852  4.99870892   .00000000
GAMMA IS:
 .02272566
AFTER Y-ROTATE
  .00000000   .00000000  5.00000000   .00000000   .00000000
  .00000000  5.00000000   .00000000   .00000000  25.00000000
  .00000000   .00000000   .00000000  5.00000000   .00000000
```

[1]    ∇ CALIBRATE
[2]    MSG
[3]    'CALIBRATION SENSOR VALUES:'
[4]    □←'S1: ', 12 6  S1←10 4 ,S1
[5]    □←'S2: ', 12 6  S2←4 4 ,S2
[6]    □←'S3: ', 12 6  S3←4 10 ,S3
[7]    □←'S4: ', 12 6  S4←10,S4,6
[8]    □←'S5: ', 12 6  S5←4,S5,6
[9]    □←'S6: ', 12 6  S6←S6, 6 6
[10]   □←' '
[11]   
[12]   CALCULATE PLANE 'AA'
[13]   PAAA← 1 1 1   3 3 ρS1,S2,S3
[14]   
[15]   FIND THE EQU. FOR THE NORMAL TO
       'AA' THRU S4
[16]   NAA4←PAAA CALCXN S4
[17]   
[18]   FIND THE EQU. FOR THE NORMAL TO
       'AA' THRU S6
[19]   NAA6←PAAA CALCXN S6
[20]   
[21]   CALCULATE PLANE 'BB'S EQUATION
[22]   PBBB← 1 1 1   3 3 ρS4,S5,NAA4
[23]   NBB6←PBBB CALCXN S6
[24]   
[25]   CALCULATE PLANE 'CC'
[26]   PCCC← 1 1 1   3 3 ρNBB6,NAA6,S6
[27]   
[28]   PH← 1 1 1   3 3 ρPAAA,PBBB,PCCC
[29]   
[30]   ROOTX←(+/((NAA4−PH)*2))*÷2
[31]   ROOTY←(+/((NAA6−PH)*2))*÷2
[32]   ROOTZ←(+/((NBB6−PH)*2))*÷2
[33]   
[34]   CALCULATE CORDINATES FOR THE
       CUBES ORIGO
[35]   
[36]   ΔPXX←(5×(NAA4−PH))÷ROOTX
[37]   ΔPYY←(5×(NAA6−PH))÷ROOTY
[38]   ΔPZZ←(5×(NBB6−PH))÷ROOTZ
[39]   PC0←PH+ΔPXX+ΔPYY+ΔPZZ
[40]   
[41]   CALCULATE PDD, PEE, PFF AND PJJ
[42]   PDD←PC0+ΔPYY
[43]   PEE←PC0+ΔPXX
[44]   PFF←PC0+ΔPZZ
[45]   PJJ←PC0+5×ΔPYY
[46]   
[47]   CREATE CUBE AND JOINT MATRIX
[48]   PCUJO← 5 3 ρPC0,PDD,PEE,PFF,PJJ
[49]   'THIS IS THE MATRIX IN ROBOT COORDINATES.'
[50]   (−10 ↑ 'PC0'),(−15 ↑ 'PDD'),(−15 ↑ 'PEE'),
       (−15 ↑ 'PFF'),(−15 ↑ 'PJJ')
[51]   15 8 DISP PCUJO
[52]   
[53]   TRANSLATE FROM THE ROBOT COORDINATE
       SYSTEM TO THE CUBE CENTRAL HOME
       COORDINATE SYSTEM
[54]   PCUJO←PCUJO−7
[55]   'THIS IS THE MATRIX IN CUBE CENTRAL
       HOME COORDINATES.'
[56]   15 8 DISP PCUJO
[57]   
[58]   LENGTH OF ARM BETWEEN JOINT AND
       GRIPPER IS 25
[59]   PJJ0← 0 25 0
[60]   'THIS IS THE REQUIRED MOVEMENT OF
       THE JOINT.'
[61]   15 8 DISP 0 25 0 −PCUJO[;5]

TABLE I-continued

[62]

Table 2 below shows an example of simulation with assumed sensor values S1–S6.

TABLE 2

| | |
|---|---|
| [63] | MAKE 'PCUJO' A TRANSLATE MATRIX |
| [64] | PCUJO←4 5 ↑ PCUJO |
| [65] | PCUJO[4;]←1 |
| [66] | MTRANS←(∅−4+ι4)∅ 4 4 ρ 1 0 0 0 |
| [67] | MTRANS[ι3;4]←−−PC0−7 |
| [68] | TRORIGO← ⁻1 0 ↓ MTRANS+.×PCUJO |
| [69] | 'THIS IS THE TRANSLATED MATRIX.' |
| [70] | 15 8 DISP TRORIGO |
| [71] | |
| [72] | PJJ←TRORIGO[;5] |
| [73] | PFF←TRORIGO[;4] |
| [74] | |
| [75] | 'ALPHA IS:' |
| [76] | 15 8 DISP(⁻3o(PJJ[3]÷PJJ[2])) |
| [77] | ROTXAX← 3 3 ρ9 ↑ 1 |
| [78] | ROTXAX[2;2]←ROTXAX[3;3]←2o−(⁻3o(PJJ[3]÷PJJ[2])) |
| [79] | ROTXAX[2;3]←−−ROTXAX[3;2]←1o−(⁻3o(PJJ[3]÷PJJ[2])) |
| [80] | TRORIGO←ROTXAX+.×TRORIGO |
| [81] | 'AFTER X-ROTATE.' |
| [82] | 15 8 DISP TRORIGO |
| [83] | |
| [84] | 'BETA IS:' |
| [85] | 15 8 DISP(⁻3o(PJJ[1]÷PJJ[2])) |
| [86] | ROTZAX← 3 3 ρ⁻9 ↑ 1 |
| [87] | ROTZAX[1;1]←ROTZAX[2;2]←2o(⁻3o(TRORIGO[1;5]÷TRORIGO[2;5])) |
| [88] | ROTZAX[1;2]←−−ROTZAX[2;1]←1o(⁻3o(TRORIGO[1;5]÷TRORIGO[2;5])) |
| [89] | TRORIGO←ROTZAX+.×TRORIGO |
| [90] | 'AFTER Z−ROTATE' |
| [91] | 15 8 DISP TRORIGO |
| [92] | |
| [93] | 'GAMMA IS:' |
| [94] | 15 8 DISP GAMMA←⁻1o−TRORIGO[1;4]÷5 |
| [95] | |
| [96] | ROTYAX← 3 3 ρ9 ↑ 0 0 0 0 1 |
| [97] | ROTYAX[1;1]←ROYTAX[3;3]←2oGAMMA |
| [98] | ROTYAX[3;1]←−−ROTYAX[1;3]←1oGAMMA |
| [99] | TRORIGO←ROTYAX+.×TRORIGO |
| [100] | 'AFTER Y−ROTATE' |
| [101] | 15 8 DISP TRORIGO |
| | ∇ |
| | ∇ Z←ABC CALCXN PN;A;B;C;X;Y;XN;YN;ZN |
| [1] | A←ABC[1] |
| [2] | B←ABC[2] |
| [3] | C←ABC[3] |
| [4] | X←PN[1] |
| [5] | Y←PN[2] |
| [6] | Z←PN[3] |
| [7] | XN←(((((B*2)+(C*2))+X)−((A×B×Y)+(A×C×Z)))+A)÷((A*2)+(B*2)+(C*2)) |
| [8] | YN←(((XN−X)×B)÷A)+Y |
| [9] | ZN←(((XN−X)×C)÷A)+Z |
| [10] | Z←XN,YN,ZN |
| [11] | |
| | ∇ |

We claim:

1. A system for automatically calibrating and compensating a robot in all degrees of freedom, characterized by the steps of:

grasping a measuring body at a predetermined position with the robot gripper;

moving said measuring body held by the robot gripper in response to a robot command to a previously determined nominal position within a measuring fixture;

determining the actual position reached by said measuring body by means of simultaneous actual measurement by means of a plurality of sensing means;

calculating the differences in the different coordinate directions between the measurement values received from said sensing means and the nominal position values, and compensating for said differences in the respective coordinate directions.

2. A system according to claim 1, characterized in that said measuring body includes a plurality of surfaces, the positions of which are exactly defined in relation to said gripper.

3. A system according to claim 2, characterized in that said plurality of surfaces are perpendicular to each other.

4. A system according to claim 1, characterized in that said measuring body includes three surfaces of a cube and said predetermined position at which said measuring body is grasped is determined by aligning the gripper definition point with the cube central point.

5. A system according to claim 4, characterized in that said measuring body includes an intermediate wall having a guiding profile for guiding the cube central point into coincidence with the gripper definition point.

6. A system according to claim 1, characterized in that the measuring fixture consists of a number of surfaces, the position of which are exactly defined in relation to the robot coordinate system, said measuring fixture surfaces having said sensing means located therein in a predetermined pattern.

7. A system according to claim 6, characterized in that said measuring fixture surfaces are perpendicular to each other.

8. A system according to claim 6, characterized in that said measuring fixture includes three surfaces of a cube which surfaces correspond to the three surfaces of a cube in said measuring body.

9. A system according to claim 8, characterized in that the three measuring fixture surfaces of a cube include three of said sensing means in a first surface of a cube two of said sensing means in a second surface of a cube and one of said sensing means in a third surface of a cube.

* * * * *